May 24, 1949.  W. C. HALE, JR  2,470,927
FASTENING MEANS
Filed Jan. 10, 1947  2 Sheets-Sheet 1
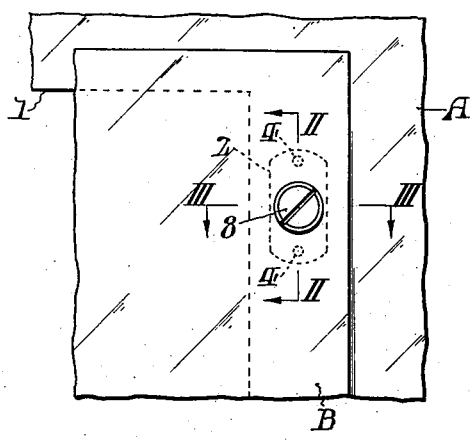
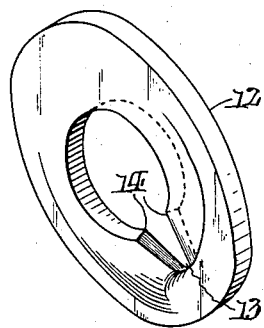
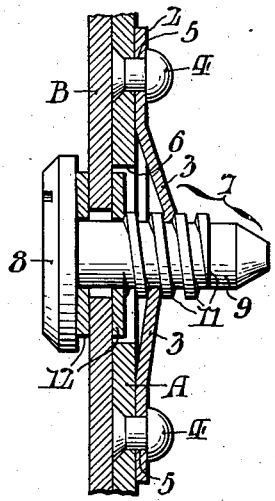
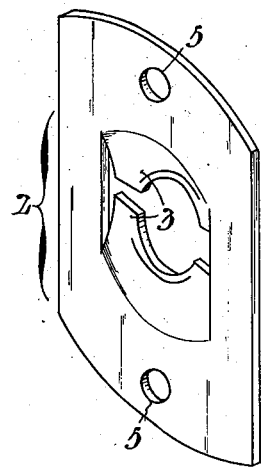
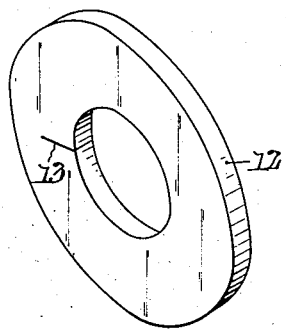
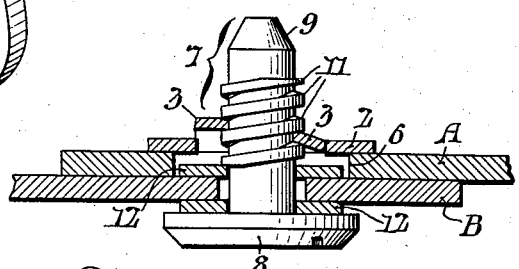
INVENTOR:
William C. Hale, Jr.,
BY Paul & Paul
ATTORNEYS.

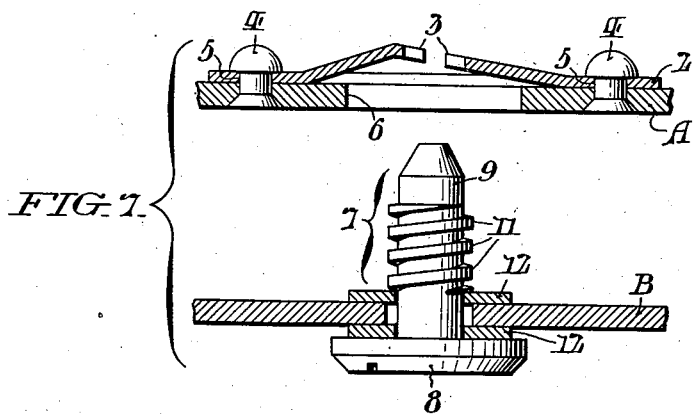
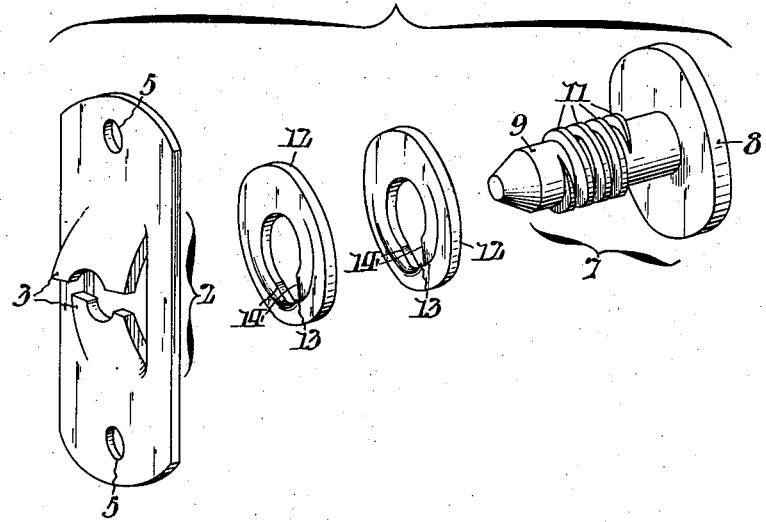

Patented May 24, 1949

2,470,927

UNITED STATES PATENT OFFICE 2,470,927

FASTENING MEANS

William C. Hale, Jr., Chester, Pa., assignor to South Chester Corporation, Chester, Pa., a corporation of Delaware Application January 10, 1947, Serial No. 721,341

1 Claim. (Cl. 151—21)

This invention relates to fastening means and more particularly to an assembly involving a threaded fastening element and a captive washer used in association therewith.

Various forms of fastening devices are now in common use for joining sheet metal parts together, one such device consisting of a threaded screw fastening element which passes through apertures in the parts to be joined and is engaged by a nut element comprising spring tongues struck and formed from a flat sheet of metal to conform to the helical contour of the threads of the fastener. With such devices and with many other types of fastening devices it is often desirable to have the screw element permanently associated with one of the parts to be joined and to have the nut element similarly associated with the other part. For example, in the case of removable doors, lids or panels which are desired to be attached to a base or body member in such manner that they may quickly be applied and screwed down, and yet be capable of being readily unscrewed or removed as occasion demands, there is obvious advantage in having the screw element retained in place so that it cannot become lost or misplaced.

The principal object of the present invention is to provide a fastening device of this general character in which the screw element is retained in permanent association with one of the two parts to be detachably connected, and more specifically to achieve this result by means of a washer which is so designed that it holds the screw element in captive relation to such part.

A further object of the invention is to provide a washer which is so formed originally that it may enter the threads of the screw element and be progressed therealong to a position near the head of the screw but which is adapted to be easily pressed to a new shape such that it cannot reenter the threads or become separated from the screw element.

A further object of the invention it to provide an assembly in which washers of this character may perform either the function of locking the parts of the assembly together, without impairing relative movement between the screw element and the part with which it is associated, or the function of reducing wear between the relatively movable surfaces, or may at the same time perform both of said functions.

A further object of the invention is to provide an assembly including a washer of the character indicated in which the screw element, although free to turn with respect to the part with which it is so associated, is retained in a position at substantially right angles to said part so that a series of similar screw elements assembled with such washers may be quickly brought into registry with a corresponding number of nut elements when the two parts with which such elements are associated are to be joined together.

Other objects and advantages of my invention, including the benefits derived from utilizing a washer which is of simple construction, economical to manufacture, and which can be readily applied by simple tools which can be brought to the work, will become more apparent from the description of one embodiment of the invention which follows hereinafter, having reference to the accompanying drawings. Of the drawings:

Fig. 1 is a front elevation showing portions of two sheet metal parts joined together by fastening means embodying the present invention;

Fig. 2 represents a vertical cross section of the fastening means taken as indicated by the arrows II—II of Fig. 1;

Fig. 3 represents a horizontal cross section of the fastening means taken as indicated by the arrows III—III of Fig. 1;

Fig. 4 represents a perspective view of the nut element which is attached to the rear face of one of the parts to be joined;

Fig. 5 represents a perspective view of the special form of washer employed in association with the screw element, showing the washer in the form which it assumes when it is first applied to the screw element;

Fig. 6 is a perspective view of the washer in the form which it finally takes after the assembly of the fastening means has been completed;

Fig. 7 is an exploded view showing the two parts which are to be joined together with the nut and screw elements applied thereto and illustrating how these elements are assembled when brought into registry with each other; and Fig. 8 is an exploded view showing in perspective the nut and screw elements and a pair of washers with all of these elements aligned in concentric relation.

In the drawings the two sheet metal parts to be joined together are indicated at A and B. For purposes of illustration it may be assumed that part A represents a stationary part having an opening therein as indicated at 1, and that part B represents a removable panel or closure member which is adapted to cover the opening 1 but which may be disconnected from part A and removed whenever it is desired to have access to the opening.

Associated with stationary part A is a nut element 2 which is of a well known type and consists of a flat plate with spring tongues 3 struck and formed to conform to the helical contour of the threads of the companion fastening element. The nut element 2 is affixed to the stationary part A by means of rivets 4 passing through holes 5 at opposite ends of the flat plate. The other element is applied at the rear face of part A with the circular edges of the spring tongues 3 disposed in concentric relation to a larger circular opening 6 in part A.

A threaded screw fastener 7 is associated with the removable part B. It comprises a slotted head 8 and a shank 9 having raised threads 11 extending along throughout a portion of the shank and terminating short of the head. In the illustrated example of the invention two washers 12 are interposed between the head 8 and the threads 11 of the screw fastener 7, one such washer being at each side of the removable part B.

Each washer 12 initially takes the form represented in Fig. 5. It consists of a thin flat ring having an inside diameter such that the washer will fit over the shank 9 of the screw fastener 7. As indicated at 13 the washer 12 has a partial radial cut and the adjacent material is helically bent from the normal flat plane to correspond substantially to the pitch and contour of the screw threads 11. Such bending of the material adjacent to the radial cut 13 provides lips 14 which are oppositely disposed, one on each side of the washer, as illustrated in Fig. 5. It is thus possible to apply the washer 12 to the screw fastener 7 by passing it over the free end of the shank 9 and then causing the lips 14 formed adjacent to the radial cut 13 to enter the threads 11. By relative turning of the washer 12 with respect to the screw fastener 7 the washer may then be progressed along the threads 11 to the unthreaded portion of the shank 9. In an obvious manner two washers 12 may thus be applied to the screw fastener, one washer being interposed between the head 8 and the part B and the other washer being placed at the opposite side of the part B so that in the final assembly it fits within the opening 6 of part A.

When each washer 12 is thus applied to the fastening screw 7 and after it has been moved to the unthreaded portion of the shank 9 it is flattened to the shape represented in Fig. 6. This may be accomplished by means of a hollow cylindrical tool which passes over the shank 7 of the screw fastener and which presses against the bent portions of the washer 12 closing the gap at the radial cut 13. The washer which is interposed between the head 8 of the screw fastener 7 and the part B serves to reduce wear upon the outer face of the part B and may be used to advantage in those situations where this part is of softer material than the screw fastener. Inasmuch as this washer fits snugly over the shank 9 of the screw fastener 7 any abrasion or wear caused by relative movement of the engaging surfaces is confined to areas which are concealed from view. The second washer 12 which is disposed at the opposite side of the part B performs a number of functions. It also assists in reducing wear; it holds the screw fastener 7 in captive relation to the part B; and it centers the screw fastener within the part B maintaining it in a position substantially at right angles therewith.

When the washers 12 have been applied to the screw fastener 7 in the manner described above and have been flattened, one at each side of part B, these elements are held in assembled relation in the manner indicated in Fig. 7. It will be observed that the elements thus assembled are permanently retained because the washer 12 adjacent to the threaded portion of the shank 9 cannot reenter the threads or be removed in any manner. The unthreaded portion of the screw adjacent to the head 8 being of a length substantially corresponding to the combined thickness of the two washers 12 and the part B, the fastening screw 7, while free to turn with respect to the part B, is held in fixed relation thereto. Accordingly where a series of screw fasteners 7 are thus employed in association with the removable part B, and a similar series of nut elements 2 are affixed to the stationary part A, the screw fasteners 7 may be readily brought into registry with the nuts 2. The operation of joining the two parts together is thus greatly simplified. This is of particular advantage where doors, panels, lids or other removable members are required to be frequently connected and disconnected from a stationary member.

The washers 12 can be stamped out from a flat plate, cut and formed by simple operations and caused to fit the threads 11 of the screw fastener in such manner that the washers may be easily moved through the threads. Desirably the washers 12 are made of relatively soft metal, such as copper or phosphor bronze. By utilizing a radial cut 13 which extends only part way from the inner edge to the outer periphery of the washer only the inner portion of the washer need be deformed to cause it to fit the screw threads. The outer portion is at all times flat and continuous and sharp edges are avoided.

Although I have shown and described an example of the invention involving the use of two washers, it will be apparent that the invention is equally applicable to assemblies in which only one washer is employed. It will also be apparent that various modifications may be made in the form of the fastening elements or the uses to which they may be put, all without departing from the spirit of the invention as defined in the annexed claim.

Having thus described my invention, I claim:

In combination, an apertured panel or the like, fastening means for attaching the panel to another object comprising a screw having a head and a shank with raised threads extending therealong and terminating short of the head, a washer surrounding said shank at its unthreaded portion, said washer being in the form of a thin annular ring having an internal diameter such that it fits over said unthreaded portion of the shank and having a partial radial cut extending from its inner edge towards its outer edge with lips adjacent to said radial cut helically bent out of the normal plane of said annular ring in opposite directions therefrom to conform to the pitch of the screw whereby the washer may enter the screw threads and be progressed along the shank to said unthreaded portion only by relative rotation between the screw and washer; and said washer being of such material and thinness that it may readily be flattened, while so positioned on the screw, to prevent its withdrawal, said panel or like element to be fastened being disposed between said screw head and washer and having an aperture larger than the threaded portion of the shank, and the unthreaded portion of the shank being of a length substantially corresponding to the combined thickness of the elements, including said panel and washer, assembled thereon whereby the screw may be maintained in a position at right angles to said elements.

WILLIAM C. HALE, Jr.

REFERENCES CITED

The following references are of record in the file of this patent:

UNITED STATES PATENTS

| Number | Name | Date |
| --- | --- | --- |
| 1,547,162 | Bohlman | July 28, 1925 |
| 1,868,415 | Gunderson et al. | July 19, 1932 |
| 2,119,520 | Brokering | June 7, 1938 |
| 2,169,182 | Kost | Aug. 8, 1939 |
| 2,172,258 | Place | Sept. 5, 1939 |
| 2,176,411 | Washer | Oct. 17, 1939 |
| 2,236,850 | Hansman | Apr. 1, 1941 |
| 2,257,959 | Hoppenstand | Oct. 7, 1941 |
| 2,258,555 | Kost | Oct. 7, 1941 |